(12) United States Patent
Barsness et al.

(10) Patent No.: US 7,831,620 B2
(45) Date of Patent: Nov. 9, 2010

(54) MANAGING EXECUTION OF A QUERY AGAINST A PARTITIONED DATABASE

(75) Inventors: Eric L. Barsness, Pine Island, MN (US); John M. Santosuosso, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 519 days.

(21) Appl. No.: 11/468,951

(22) Filed: Aug. 31, 2006

(65) Prior Publication Data
US 2008/0059407 A1 Mar. 6, 2008

(51) Int. Cl.
*G06F 7/00* (2006.01)
(52) U.S. Cl. .................. 707/790; 707/702; 707/713
(58) Field of Classification Search .......... None
See application file for complete search history.

(56) References Cited

U.S. PATENT DOCUMENTS

| | | | | |
|---|---|---|---|---|
| 5,706,495 | A * | 1/1998 | Chadha et al. ............ | 707/2 |
| 5,778,354 | A * | 7/1998 | Leslie et al. ............. | 707/2 |
| 5,878,426 | A * | 3/1999 | Plasek et al. ........... | 707/102 |
| 5,918,225 | A * | 6/1999 | White et al. ............ | 707/3 |
| 5,956,706 | A * | 9/1999 | Carey et al. ............ | 707/2 |
| 6,014,656 | A * | 1/2000 | Hallmark et al. ......... | 707/2 |
| 6,026,391 | A * | 2/2000 | Osborn et al. ............ | 707/2 |
| 6,289,334 | B1 | 9/2001 | Reiner et al. | |
| 6,308,172 | B1 * | 10/2001 | Agrawal et al. ........... | 707/5 |
| 6,625,593 | B1 * | 9/2003 | Leung et al. ............ | 707/2 |
| 6,738,755 | B1 * | 5/2004 | Freytag et al. .......... | 707/2 |
| 6,931,390 | B1 * | 8/2005 | Zait et al. ............ | 707/2 |
| 7,284,022 | B2 * | 10/2007 | Kawamura ............. | 707/205 |
| 7,299,220 | B2 * | 11/2007 | Chaudhuri et al. ......... | 707/2 |
| 7,346,612 | B2 * | 3/2008 | Day et al. ............. | 707/3 |
| 2002/0184253 | A1* | 12/2002 | Agarwal et al. .......... | 707/206 |
| 2004/0133538 | A1* | 7/2004 | Amiri et al. ............ | 707/1 |
| 2004/0215638 | A1* | 10/2004 | Kapoor et al. .......... | 707/100 |
| 2005/0021505 | A1* | 1/2005 | Bernal et al. ........... | 707/3 |
| 2005/0060285 | A1* | 3/2005 | Barsness et al. ......... | 707/2 |
| 2005/0131893 | A1* | 6/2005 | Von Glan .............. | 707/5 |
| 2005/0251511 | A1* | 11/2005 | Shankar et al. .......... | 707/3 |
| 2005/0262563 | A1* | 11/2005 | Mahone et al. ........... | 726/22 |
| 2006/0271511 | A1* | 11/2006 | Harward et al. .......... | 707/2 |
| 2007/0078812 | A1* | 4/2007 | Waingold et al. ......... | 707/2 |
| 2007/0130137 | A1* | 6/2007 | Oliver et al. ........... | 707/5 |
| 2007/0162442 | A1* | 7/2007 | Brill et al. ............ | 707/5 |
| 2008/0033937 | A1* | 2/2008 | Cha et al. ............ | 707/5 |

OTHER PUBLICATIONS

Ilyas et al., Estimating Compilation Time of a Query Optimizer, Jun. 2003, ACM, pp. 373-384.*

* cited by examiner

*Primary Examiner*—Apu M Mofiz
*Assistant Examiner*—Jessica N Le
(74) *Attorney, Agent, or Firm*—Patterson & Sheridan, LLP

(57) ABSTRACT

The present invention generally relates to data processing, and more specifically to executing a query against a partitioned database. One embodiment provides a computer-implemented method of managing execution of a query against a partitioned database having a plurality of data partitions. The method comprises issuing a query for execution against each of the plurality of data partitions. Then, it is determined whether a complete query result is returned for the query before execution of the query has completed against each of the plurality of data partitions. If so, execution of the query is terminated on at least one of the plurality of data partitions.

18 Claims, 5 Drawing Sheets

MANAGING EXECUTION OF A QUERY AGAINST A PARTITIONED DATABASE

BACKGROUND OF THE INVENTION

1. Field of the Invention

The present invention generally relates to data processing and, more particularly, to executing queries against a partitioned database.

2. Description of the Related Art

Databases are computerized information storage and retrieval systems. A relational database management system (RDBMS) is a database management system (DBMS) that uses techniques for storing and retrieving data. The most prevalent type of database is the relational database, a tabular database in which data is defined so that it can be reorganized and accessed in a number of different ways.

Databases are typically partitioned to improve availability, performance, and scalability. Partitioning a database involves dividing the database or its constituent elements into distinct individual parts. For example, a database may be partitioned by building smaller separate databases, each with its own tables, indexes, transaction logs, etc. or by splitting a selected element, for example a field of a table. The database may be partitioned within a single server, or distributed or replicated across multiple servers. Therefore, database partitioning provides multiple benefits including scalability to support large databases, the ability to handle complex workloads, and increased parallelism.

When queries are run against a partitioned database, the query may be run against each partition. The results from each partition may then be integrated to provide a complete query result for the query. To further improve performance of querying a database, the query may not be run against one or more partitions which are known to not contain results for the query. For example, an underlying database may be partitioned based on location. The locations, for example, may be divided into 4 partitions, each partition being associated with data from one of the eastern states, western states, northern states, and southern states.

If a query containing a condition STATE='MAINE' is run against the underlying database, the query need not be run against partitions containing data for southern and western states. Therefore, by eliminating the number of partitions against which a query is executed, the performance may be improved. However, even with elimination of partitions, the query may still be run against multiple partitions. For example, the above query may be executed against the northern states partition and the eastern states partition.

One problem with running a query against multiple partitions is that result sets from different partitions may include redundant results. For example, assume that the above query is run against the partitions containing data for the northern and eastern states in order to identify different age groups of individuals driving a particular automobile. Assume further that data related to ten distinct age groups is included with the underlying database and that the eastern states partition is slower than the northern states partition. In other words, determination of a result set from the eastern states partition takes significantly longer than determination of a result set from the northern states partition. Assume now that a first result set is quickly returned from the northern states partition having data for all ten age groups. Accordingly, a second result set returned from the eastern states partition would include redundant data, as all age groups are already identified in the first result set. Thus, execution of the query against the underlying database is inefficient because the complete result set for the above query is not returned to the user until the results from the slower partition, i.e., the eastern states partition, are available. Furthermore, a significant amount of time may be wasted while waiting for the slower partition to retrieve results. Therefore overall query throughput may be adversely affected.

Therefore, there is a need for an efficient technique for managing execution of queries against partitioned databases.

SUMMARY OF THE INVENTION

The present invention generally relates to data processing, and more specifically to executing queries against a partitioned database.

One embodiment provides a computer-implemented method of managing execution of a query against a partitioned database having a plurality of data partitions. The method comprises issuing a query for execution against each of the plurality of data partitions. Then, it is determined whether a complete query result is returned for the query before execution of the query has completed against each of the plurality of data partitions. If so, execution of the query is terminated on at least one of the plurality of data partitions.

Another embodiment provides a computer-readable medium containing a program which, when executed by a processor, performs a process for managing execution of a query against a partitioned database having a plurality of data partitions. The process comprises issuing a query for execution against each of the plurality of data partitions. Then, it is determined whether a complete query result is returned for the query before execution of the query has completed against each of the plurality of data partitions. If so, execution of the query is terminated on at least one of the plurality of data partitions.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Introduction

Figure 1:
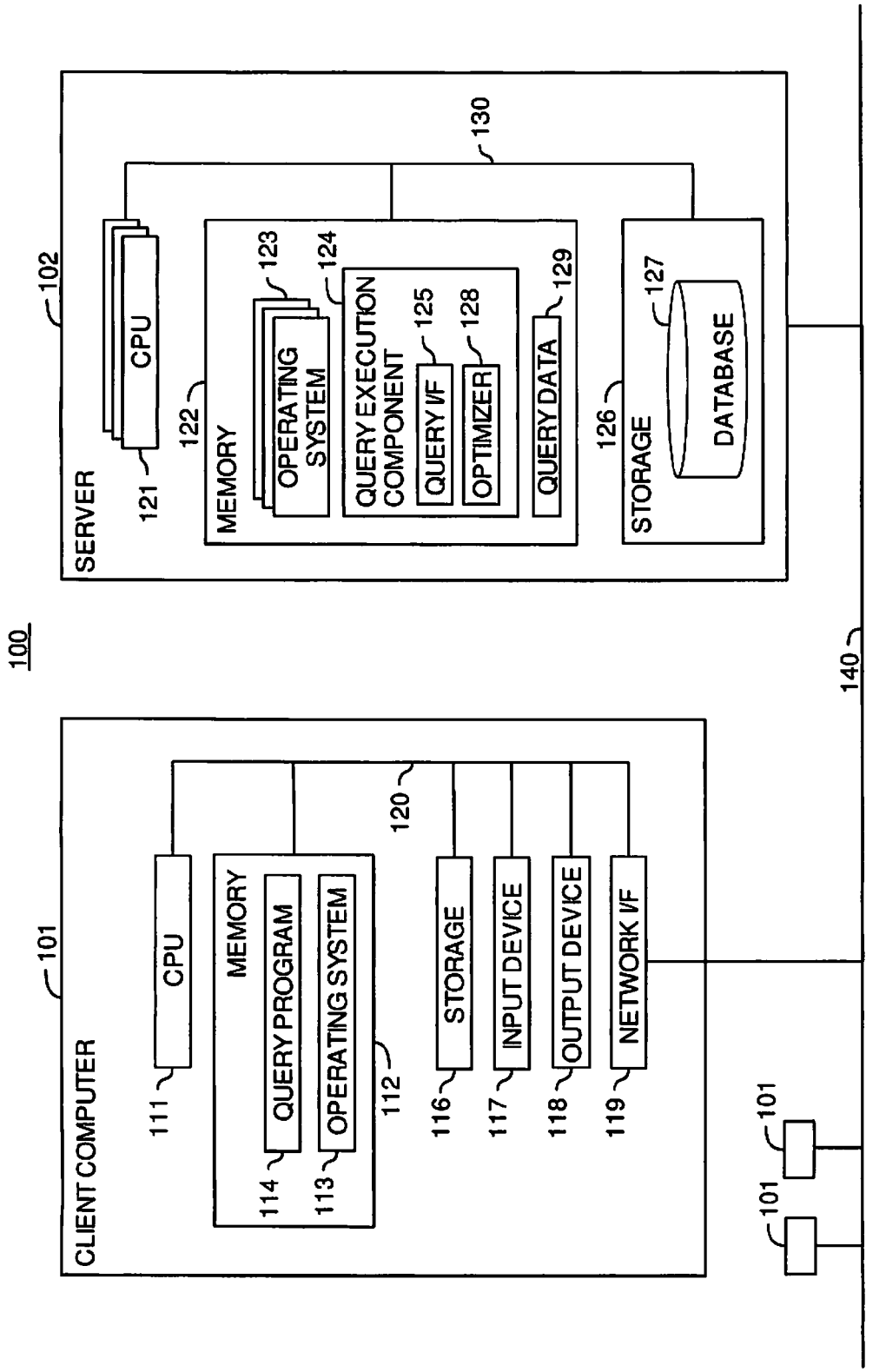
FIG. 1 is an illustration of an exemplary computer system according to one embodiment of the invention.

The present invention generally relates to data processing and, more particularly, to executing a query against a partitioned database having a plurality of data partitions. According to one aspect, the query is executed against each of the plurality of data partitions to determine a corresponding result set from each data partition. The determined result sets from the plurality of data partitions may be integrated to provide a query result for the query. However, result sets for distinct data partitions can be returned at different points of time. Factors resulting in different query execution times for distinct data partitions may include different data partition sizes, availability of corresponding CPUs required for query execution against the distinct data partitions, clock speed, and the like.

Therefore, in one embodiment query execution is improved and accelerated by determining whether a complete query result is returned for an issued query before execution of the query has completed against each of the plurality of data partitions. If so, execution of the issued query is terminated on at least one of the plurality of data partitions.

In other words, if execution (or completion of execution) of the issued query against a given data partition is determined to provide only redundant results with respect to the complete query result, the query execution is terminated.

Preferred Embodiments

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system such as, for example, the network environment 100 shown in FIG. 1 and described below. The program(s) of the program product defines functions of the embodiments (including the methods described herein) and can be contained on a variety of computer-readable media. Illustrative computer-readable media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

An Exemplary Computer System

FIG. 1 depicts a block diagram of a networked system 100 in which embodiments of the present invention may be implemented. In general, the networked system 100 includes a client (e.g., user's) computer 101 (three such client computers 101 are shown) and at least one server 102 (one such server 102 shown). The client computers 101 and server 102 are connected via a network 140. In general, the network 140 may be a local area network (LAN) and/or a wide area network (WAN). In a particular embodiment, the network 140 is the Internet.

The client computer 101 includes a Central Processing Unit (CPU) 111 connected via a bus 120 to a memory 112, storage 116, an input device 117, an output device 118, and a network interface device 119. The input device 117 can be any device configured to give input to the client computer 101. For example, a keyboard, keypad, light-pen, touch-screen, track-ball, or speech recognition unit, audio/video player, and the like could be used. The output device 118 can be any device configured to give output to the user, e.g., any conventional display screen. Although shown separately from the input device 117, the output device 118 and the input device 117 could be combined. For example, a display screen with an integrated touch-screen, a display with an integrated keyboard, or a speech recognition unit combined with a text speech converter could be used.

The network interface device 119 may be any entry/exit device configured to allow network communications between the client computers 101 and server 102 via the network 140. For example, the network interface device 119 may be a network adapter or other network interface card (NIC).

Storage 116 is preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 112 and storage 116 could be part of one virtual address space spanning multiple primary and secondary storage devices.

The memory 112 is preferably a random access memory sufficiently large to hold the necessary programming and data structures of the invention. While memory 112 is shown as a single entity, it should be understood that memory 112 may in fact comprise a plurality of modules, and that memory 112 may exist at multiple levels, from high speed registers and caches to lower speed but larger DRAM chips.

Illustratively, the memory 112 contains an operating system 113. Illustrative operating systems, which may be used to advantage, include Linux (Linux is a trademark of Linus Torvalds in the US, other countries, or both) and Microsoft's Windows®. More generally, any operating system supporting the functions disclosed herein may be used.

Memory 112 is also shown containing a query program 114 which, when executed by CPU 111, provides support for querying a server 102. In one embodiment, the query program 114 includes a web-based Graphical User Interface (GUI), which allows the user to display Hyper Text Markup Language (HTML) information. More generally, however, the query program 114 may be a GUI-based program capable of rendering the information transferred between the client computer 101 and the server 102.

The server 102 may by physically arranged in a manner similar to the client computer 101. Accordingly, the server 102 is shown generally comprising one or more CPUs 121, a memory 122, and a storage device 126, coupled to one another by a bus 130. Memory 122 may be a random access memory sufficiently large to hold the necessary programming and data structures that are located on the server 102.

In one embodiment of the invention, server 102 may be a logically partitioned system, wherein each partition of the system is assigned one or more resources available in server 102. Accordingly, server 102 may generally be under the control of one or more operating systems 123 shown residing in memory 122. Each logical partition of server 102 may be under the control of one of the operating systems 123. Examples of the operating system 123 include IBM OS/400®, UNIX, Microsoft Windows®, and the like. More generally, any operating system capable of supporting the functions described herein may be used.

While a logically partitioned system is described herein, one skilled in the art will recognize that embodiments of the invention are not limited to such logically partitioned systems. Embodiments of the invention may also be implemented in physically partitioned systems, non-partitioned systems, or any other reasonable system configuration.

The memory 122 may include a query execution component 124. The query execution component 124 may be a software product comprising a plurality of instructions that can be resident at various times in various memory and storage devices in the computer system 100. For example, the query execution component 124 may contain a query interface 125. The query interface 125 (and more generally, any requesting entity, including the operating system 123) is configured to issue queries against a database 127 (shown in storage 126).

Query execution component 124 may also include an optimizer 128. Optimizer 128 may determine the most efficient way to execute a query. For example, optimizer 128 may consider a plurality of access plans for a given query and determine which of those plans will be the most efficient. Determining efficiency of an access plan may include determining an estimated cost for executing the query. The cost may be determined, for example, by available memory, number of Input/Output (IO) operations required to execute the query, CPU requirements, and the like.

Database 127 is representative of any collection of data regardless of the particular physical representation. By way of illustration, the database 127 may be organized according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of data.

In one embodiment of the invention, the database 127 is a partitioned database. Accordingly, database 127 may be divided or broken into its constituent elements to create distinct individual parts referred to as "data partitions". A data partition consists of its own data, indexes, configuration files, and transaction logs. A data partition is sometimes called a node or a database node. For example, database 127 may be partitioned by building smaller separate databases, each with its own tables, indexes, transaction logs, etc., or by splitting a selected element, for example a field of a table. Tables can be located in one or more data partitions. When a table's data is distributed across multiple partitions, some of its rows are stored in one partition, and other rows are stored in other partitions.

In one embodiment, database 127 contains one or more data partitions of a larger database. Thus, in one embodiment, the individual partitions may be distributed over a plurality of servers (such as server 102). A query received from a client 102 may be executed against one or more of the data partitions of the larger database contained in the one or more servers 102. Data retrieval and update requests are decomposed automatically into sub-requests, and executed in parallel among the applicable data partitions. The fact that databases are split across data partitions may be transparent to users.

Typically, a single data partition exists on each physical component that makes up a computer. The processors on each system are used by the database manager at each data partition to manage its part of the total data in the database. Because data is divided across data partitions, the power of multiple processors on multiple computers may be used to satisfy requests for information. Data retrieval and update requests are decomposed automatically into sub-requests and are executed in parallel among the applicable data partitions.

User interaction occurs through one data partition, known as the coordinator partition for that user. The coordinator runs on the same data partition as the application, or, in the case of a remote application, the data partition to which that application is connected. Any data partition can be used as a coordinator partition.

Memory 122 illustratively also includes query data 129. Query data 129 may include historical execution metrics for queries executed against one or more partitions of the database 127. The execution metrics, for example, may include the query execution time for each partition of the database 127.

An Exemplary Partitioned Database Environment

Figure 2:
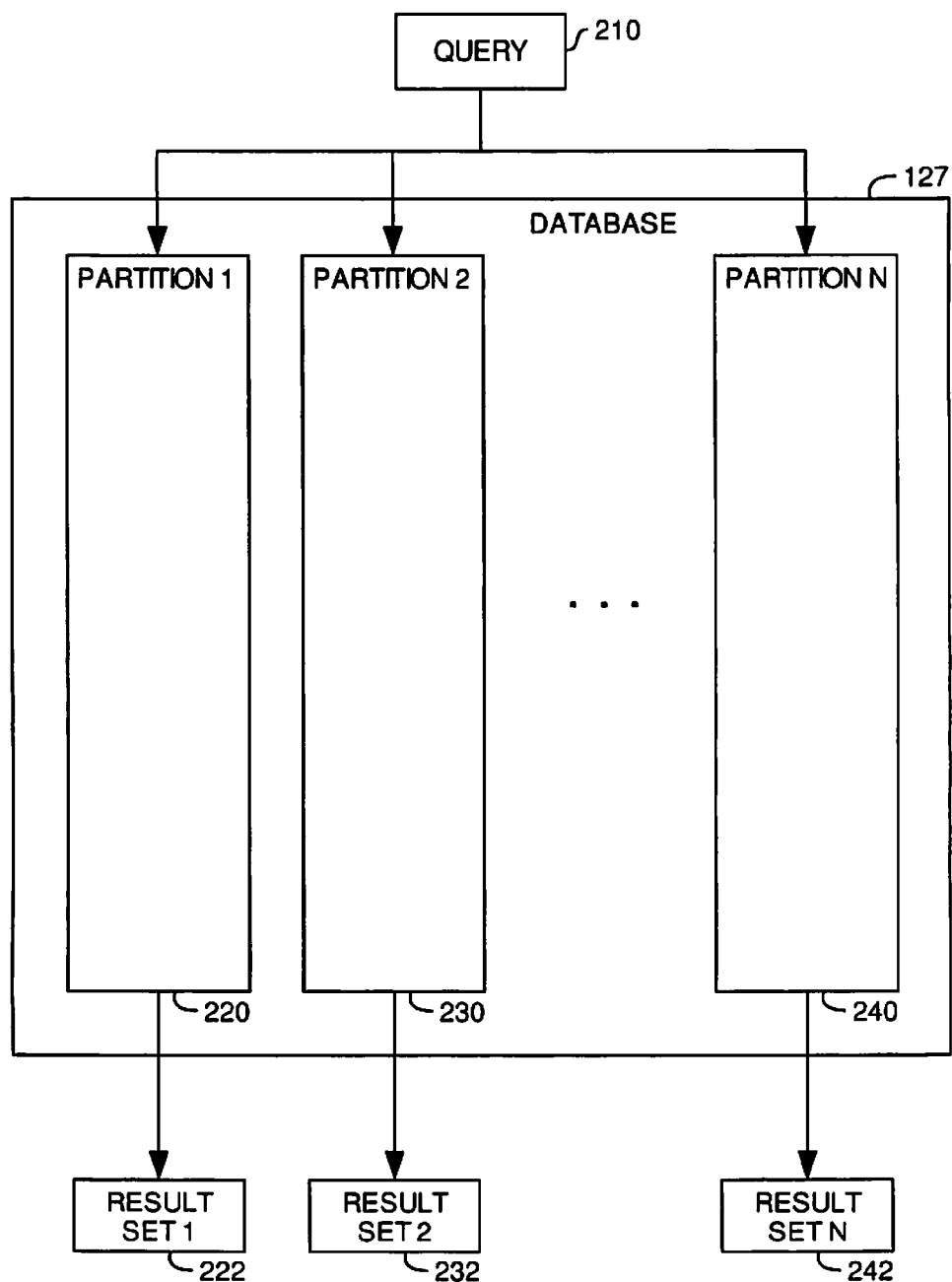
FIG. 2 is an illustration of a partitioned database, according to one embodiment of the invention.

FIG. 2 illustrates an exemplary implementation of the database 127 of FIG. 1 as a partitioned database according to one embodiment of the invention. Accordingly, the database 127 illustratively includes a plurality of data partitions 220 "PARTITION 1", 230 "PARTITION 2" and 240 "PARTITION N" (three partitions are illustrated, for simplicity).

In one embodiment, a query 210 is executed against the database 127. Executing the query 210 against the database 127 involves running the query 210 against one or more of the plurality of data partitions 220, 230, 240. Illustratively, the query 210 is executed against each of the data partitions 220, 230, 240. Accordingly, from each of the data partitions 220, 230, 240 a corresponding result set 222, 232, 242 is returned. The returned result sets 222, 232, 242 can be combined to provide a complete query result for the query 210.

Query 210 may include a set of commands or clauses for retrieving data stored in the database 127. Furthermore, the query 210 may come from a client computer (e.g., client computer 102 of FIG. 1), an operating system (e.g., operating system 113 of FIG. 1), or a remote system. Moreover, the query 210 may specify columns of tables included with the database 127 from which data is to be retrieved, join criteria for joining columns from multiple tables, and conditions that must be satisfied for a particular data record to be included with one of the result sets 222, 232, 242.

One skilled in the art will recognize that when query 210 is executed against each data partition, each of the partitions 220, 230, 240 may take a different amount of time to return the corresponding result set 222, 232, 242 for the query 210. Factors affecting the time taken to retrieve results for a result set of a given partition may include the size of the partition, availability of a CPU to execute the query, clock speed, and the like.

Execution of A Query Against A Partitioned Database

Figure 3:
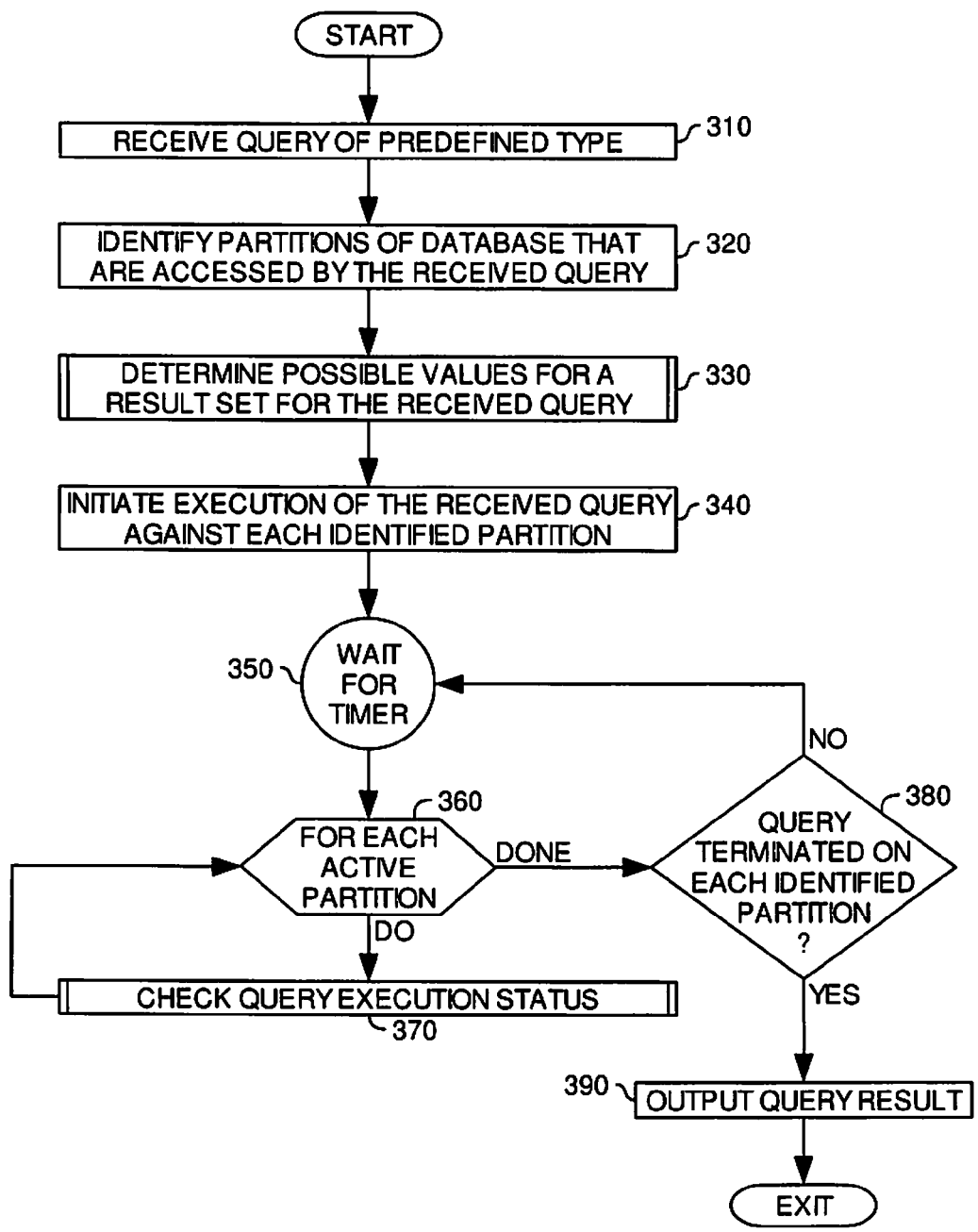
FIG. 3 is a flow chart illustrating a method of managing execution of a query against a partitioned database according to one embodiment of the invention.

Referring now to FIG. 3, one embodiment of a method 300 for managing execution of a query (e.g., query 210 of FIG. 2) against a partitioned database (e.g., partitioned database 127 of FIG. 2) is described. At least a portion of the steps of method 300 can be performed using the query execution component 124 of FIG. 1.

Method 300 starts at step 310, where a query against an underlying database(s) is received. The received query includes a results specification consisting of one or more result fields specifying what data elements should be returned from the underlying database(s) in a corresponding query result. The received query may further include selection criteria specifying one or more query conditions used to evaluate whether a given element of data should be included in the corresponding query result.

In one embodiment, the received query is of a predefined type. For instance, the received query is an SQL query having a DISTINCT, GROUP BY, UNION, UNION ALL and/or INTERSECTION clause in a corresponding results specification and/or selection criteria. However, these are exemplary query types that are merely cited by way of example, but not limiting of the invention. Instead, other query types can be used with embodiments of the invention. For instance, in one embodiment execution of an SQL query that fetches only a requested number of results using a FETCH FOR X ROWS clause, where X defines the requested number, can be terminated prior to completion of query execution on one or more partitions when data records including the requested number of results have been returned. Accordingly, any suitable predefined query type is broadly contemplated.

By way of example, assume that the exemplary query of Table I below is received. By way of illustration, the exemplary query of Table I below is defined using SQL. However, any other language may be used to advantage.

TABLE I

SQL QUERY EXAMPLE

| 001 | SELECT DISTINCT |
| 002 | grade |
| 003 | FROM |
| 004 | student_grades |
| 005 | WHERE |
| 006 | algebra_skills = 'N' |
| 007 | GROUPED BY |
| 008 | grade |

The exemplary SQL query of Table I is configured to retrieve information related to possible grades ("grade" in line 002) of students which do not have algebra skills ("algebra_skills='N'" in line 006), meaning, for example, that the students have not taken any algebra courses. This information should be retrieved from a "student_grades" table (line 003-004 of Table I) of the underlying database(s). However, the corresponding query result for the exemplary SQL query of Table I should only include distinct grades ("SELECT DISTINCT" in line 001 of Table I), i.e., each grade should be listed only once.

At step 320, all data partitions (e.g., data partitions 220, 230, 240 of FIG. 2) of the underlying database(s) that need to be queried to determine the corresponding query result are identified. For instance, assume that in the given example four distinct partitions, each having a separate "student_grades" table, need to be queried. Assume further that the underlying database(s) is partitioned based on location, such that each data partition is associated with data from one of the eastern states, western states, northern states, and southern states. An exemplary "student_grades" table in the eastern states partition is illustrated in Table II below. It should be noted that the tables referred to herein are merely for purposes of illustration and not intended to be limiting. In practice, partitioned databases used for commercial, scientific, medical, financial, etc. purposes would typically have hundreds or thousands (or more) of columns and in excess of millions of rows.

TABLE II

EASTERN STUDENT GRADES TABLE EXAMPLE

| student_ID | algebra_skills | grade |
|---|---|---|
| 001 | | |
| 002 | 1 | N | 5 |
| 003 | 2 | Y | 14 |
| 004 | 3 | N | 7 |
| 005 | 4 | N | 8 |
| 006 | 5 | N | 9 |
| 007 | 6 | Y | 15 |
| 008 | 7 | N | 12 |
| 009 | 8 | N | 6 |
| 010 | 9 | N | 10 |
| 011 | 10 | N | 11 |
| 012 | 11 | Y | 16 |
| 013 | 12 | Y | 13 |

The exemplary "student_grades" table of Table II includes three columns: "student_ID", "algebra_skills" and "grade" (line 001) and twelve rows (lines 002-013). By way of example, assume that the "student_ID" column is used as a primary key that uniquely associates each of the rows in lines 002-013 with a particular student. The "algebra_skills" column includes "Y" (i.e., "Yes") values for students having algebra skills, and "N" (i.e., "No") values for students which do not have algebra skills. The "grade" column contains the corresponding grades of the students. By way of example, assume that the grades may be integer values in a range from 5 to 16.

An exemplary "student_grades" table in the northern states partition is illustrated in Table III below. The exemplary table of Table III is constructed similar to the exemplary table of Table II above and, therefore, not described in more detail.

TABLE III

NORTHERN STUDENT GRADES TABLE EXAMPLE

| student_ID | algebra_skills | grade |
|---|---|---|
| 001 | | |
| 002 | 101 | Y | 14 |
| 003 | 102 | N | 5 |
| 004 | 103 | N | 7 |

TABLE III-continued

NORTHERN STUDENT GRADES TABLE EXAMPLE

| | student_ID | algebra_skills | grade |
|---|---|---|---|
| 005 | 104 | N | 8 |
| 006 | 105 | Y | 15 |
| 007 | 106 | N | 6 |
| 008 | 107 | N | 9 |
| 009 | 108 | N | 12 |
| 010 | 109 | Y | 13 |

An exemplary "student_grades" table in the western states partition is illustrated in Table IV below. The exemplary table of Table IV is also constructed similar to the exemplary table of Table II above and, therefore, also not described in more detail.

TABLE IV

WESTERN STUDENT GRADES TABLE EXAMPLE

| | student_ID | algebra_skills | grade |
|---|---|---|---|
| 001 | | | |
| 002 | 201 | N | 5 |
| 003 | 202 | N | 5 |
| 004 | 203 | Y | 15 |
| 005 | 204 | N | 8 |
| 006 | 205 | N | 6 |
| 007 | 206 | Y | 16 |
| 008 | 207 | N | 9 |
| 009 | 208 | N | 8 |
| 010 | 209 | Y | 14 |

An exemplary "student_grades" table in the southern states partition is illustrated in Table V below. The exemplary table of Table V is constructed similar to the exemplary table of Table II above and, therefore, also not described in more detail.

TABLE V

SOUTHERN STUDENT GRADES TABLE EXAMPLE

| | student_ID | algebra_skills | grade |
|---|---|---|---|
| 001 | | | |
| 002 | 301 | N | 5 |
| 003 | 302 | N | 5 |
| 004 | 303 | N | 5 |
| 005 | 304 | N | 5 |
| 006 | 305 | N | 5 |
| 007 | 306 | N | 5 |

By way of example, assume now that in the given example it is determined at step 320 that the exemplary received query of Table I needs to be executed against the northern, eastern, southern and western partitions, i.e., the exemplary "student_grades" tables of Tables II to V above.

At step 330, all possible values that may occur for the "grade" result field in the corresponding query result for the exemplary SQL query of Table I above are determined. Assume now that in the given example the values from 5 to 12 are identified as possible grades for students without algebra skills. An exemplary method for determining all possible values that may occur in the corresponding query result for the received query is described in more detail below with reference to FIG. 4.

It should be noted that students having algebra skills, i.e., students having a "Y" in the corresponding "algebra_skills" columns of Tables II to V, can be in grades from 13 to 16, by way of example. It should further be noted that all possible values for students without algebra skills are included with data records contained in the exemplary "student_grades" table of Table II above that represents the eastern partition.

In one embodiment, the determination of all possible values for the corresponding query result includes determining for each data partition separately all possible values that may occur in a corresponding result set (e.g., result sets 222, 232, 242 of FIG. 2). For instance, in different states different grades for students without algebra skills can be allowed. By way of example, assume that in the northern states such students can be in grades from 5 to 11, in the eastern states from 6 to 12, and in the southern and western states from 5 to 12. Thus, in order to determine all possible grades that may occur in the overall query result, all separate possible grades need to be identified and combined.

At step 340, execution of the received query against all identified data partitions is initiated. Accordingly, in the given example execution of the exemplary SQL query of Table I against the exemplary "student_grades" tables of Tables II to V is started.

At step 350, it is determined whether a predefined time interval has elapsed since query execution was started. When the predefined time interval has elapsed, a loop consisting of steps 360 and 370 is entered that is configured to determine whether query execution on one or more of the identified data partitions has completed and/or should be terminated.

Assume by way of example that query execution requires more than one hour on at least one of the identified data partitions represented by Tables II to V above. In this case, a corresponding verification process can be executed that allows verification of the query execution status each time when the predefined time interval has elapsed. For instance, if the received query is supposed to run two hours and the predefined time interval is ten minutes, than the verification process is configured to verify the query execution status every ten minutes. Accordingly, corresponding processor resources are not continuously allocated to the verification process, but dynamically attributed each time the predefined time interval has elapsed, i.e., every ten minutes, for the time required to perform the verification. Accordingly, processor resources can be economized, whereby a more efficient query processing can be achieved. In other words, when the verification process is sleeping, i.e., not executing, the corresponding processor resources can be used for execution of other tasks.

At step 360, the loop consisting of steps 360 and 370 is performed for each active data partition. In the context of the invention, an "active" data partition is a data partition for which a corresponding status flag is set to "active". In one embodiment, active data partitions include data partitions having result sets for which the loop consisting of steps 360 and 370 was not yet entered. Active data partitions further include partitions for which a result set has not been returned when the loop is entered therefore.

When the loop is entered for a given data partition at step 360, the query execution status with respect to the given partition is verified at step 370. In one embodiment, verifying the execution status of the given data partition includes determining all unique values for a given result field that are included with data records returned from the given partition in response to execution of the received query. In other words, query execution against the given data partition has not completed when the loop consisting of steps 360 and 370 is entered for this partition, i.e., a result set was not yet returned from the partition.

If the unique values of the returned data records and previously returned data records of other data partitions for the received query include all identified possible values for the given result field, it is assumed that a complete query result for the received query was determined. Accordingly, query execution on the given partition can be terminated. To this end, the status flag of the given data partition is set to "inactive" with respect to the received query such that a subsequent execution of the loop consisting of steps 360 and 370 on the given data partition can be omitted.

An exemplary method for verification of the query execution status of a data partition on which an underlying query is running is described in more detail below with reference to FIG. 4. When the loop consisting of steps 360 and 370 was performed for each active data partition, processing proceeds with step 380.

However, in one embodiment verifying the execution status of the given data partition includes determining all unique values that are included with a complete result set returned for the given partition. In other words, query execution against the given data partition has completed when the loop consisting of steps 360 and 370 is entered for this partition so that the status flag of the given partition is automatically set to "inactive" after execution of steps 360 and 370. Furthermore, if the unique values of the result set and/or previously received result sets and/or data records of other data partitions for the received query include all identified possible values, the result set(s) is considered to represent a complete query result for the received query. In other words, all result sets that were or can be obtained for data partitions that were or are still active are not required for determination of the complete query result. Accordingly, these result sets can be discarded and/or processing on corresponding data partitions for determination of these result sets can be terminated. To this end, the status flag of these data partitions is set to "inactive", in one embodiment, such that a subsequent execution of the loop consisting of steps 360 and 370 on these data partitions can be omitted.

At step 380, it is determined whether query execution is terminated for each of the data partitions that were identified at step 320. In one embodiment, determining whether query execution is terminated for a particular data partition includes determining whether the status flag of the particular partition is set to "inactive". If so, processing continues at step 390. Otherwise, processing returns to step 350, where it is again determined whether the predefined time interval has elapsed, prior to reentering the loop consisting of steps 360 and 370.

At step 390, all result sets and/or all data records that were returned from the identified data partitions in response to execution of the received query are combined to the corresponding query result for output. The corresponding query result can thus be output to a requesting entity that issued the exemplary SQL query of Table I above. Method 300 then exits.

Determination of Possible Values for A Result Set

Figure 4:
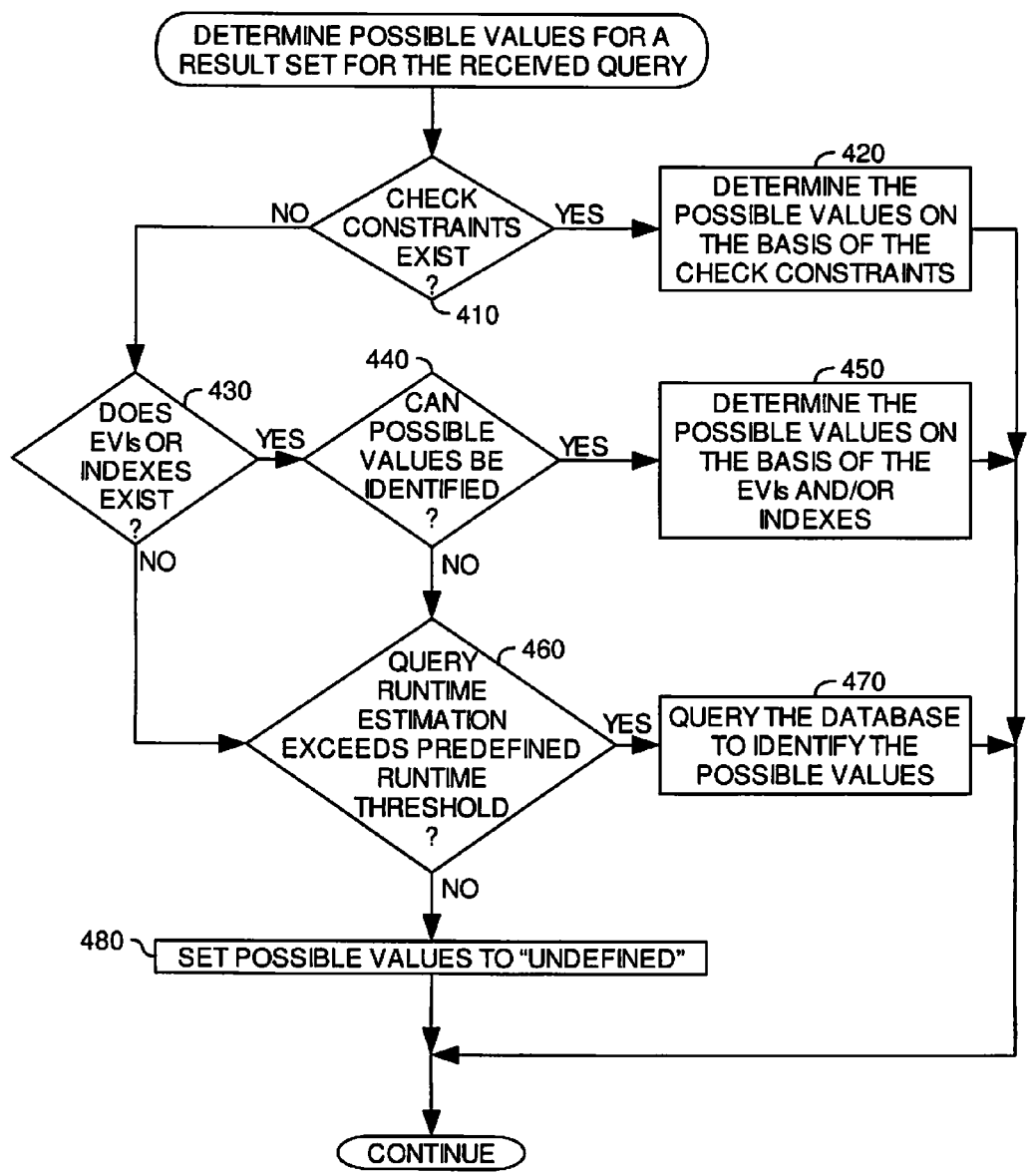
FIG. 4 is a flow chart illustrating a method of determining possible values for a result set of a query according to one embodiment of the invention.

Referring now to FIG. 4, one embodiment of a method 400 for determining possible values for a result set (e.g., result set 222, 232, 242 of FIG. 2) according to step 330 of the method 300 of FIG. 3 is described. In one embodiment, data records retrieved for one or more result fields of an underlying query (e.g., query 210 of FIG. 2) are to be included with the result set that is returned in response to execution of the query against a partitioned database (e.g., partitioned database 127 of FIG. 2). At least a portion of the steps of method 400 can be performed using the query execution component 124 of FIG. 1.

Method 400 starts at step 410, where it is determined whether check constraints related to the one or more result fields of the underlying query exist. If so, processing proceeds with step 420. Otherwise, processing proceeds with step 430.

More specifically, in one embodiment it is determined at step 410 whether check constraints on one or more columns of an underlying database table(s) which are referred to by the one or more result fields exist. In general, a check constraint specifies a restriction on values and/or expressions for a given column, thus defining possible values and/or expressions for the given column. The check constraint can be retrieved from metadata that is associated with the underlying database table(s). However, it should be noted that defining check constraints using suitable metadata is only described by way of example, and not limiting of the invention. Instead, any possible implementation of check constraints using any type of persistently stored files is broadly contemplated.

For instance, assume that in the given example a particular check constraint is defined for the "grade" columns in the exemplary "student_grades" tables of Tables II to V, which are associated with the "grade" result field in line 002 of the exemplary SQL query of Table I. Assume further that the particular check constraint indicates that students without algebra skills may only be in grades that are within a range from 5 to 12.

At step 420, the check constraints are retrieved and the possible values for the one or more result fields are identified using the retrieved check constraints. Accordingly, in the given example the particular check constraint on the "grade" columns is retrieved and the possible values 5, 6, 7, 8, 9, 10, 11 and 12 are identified. Processing then continues at step 340 of the method 300 of FIG. 3.

At step 430, it is determined whether one or more indexes, such as an encoded vector index or a bitmap index, are defined for the result field(s) of the underlying query. More specifically, such indexes can be defined for the column(s) of the underlying database table(s) that is referred to by the result field(s).

More generally, a bitmap index is an index which indicates whether a specific value exists for each row in a particular column of the underlying database table(s). One bit represents each row. For instance, there may be an index into a given table identifying all rows in a PostalCode column that have a particular postal code value. By way of example, in a bitmap index for the PostalCode column, the nth bit may equal 1 if the nth row of the given table contains a value of "45246", or 0 if that row holds a value other than "45246".

Another type of index is the encoded vector index (EVI), disclosed, for example, in U.S. Pat. No. 5,706,495, issued Jan. 6, 1998 to Chadha et al., entitled ENCODED-VECTOR INDICES FOR DECISION SUPPORT AND WAREHOUSING, which is incorporated herein by reference. An EVI serves a similar purpose as a bitmap index, but only one EVI is necessary to account for all values occurring in the column (whether they are "45246", "45202", or any other). Accordingly, in an EVI on the PostalCode column, the nth position of the EVI may contain a bit code that can be decoded using a lookup table to produce the value "45246", which is the postal code in the nth row of the table.

If it is determined at step 430 that one or more indexes exist for the result field(s), the indexes are retrieved and processing proceeds with step 440. Otherwise, processing proceeds with step 460.

At step 440, it is determined whether the possible values for the result field(s) can be determined on the basis of the one or more retrieved indexes. For instance, if an EVI is defined for a given result field, it is determined whether an associated lookup table defines all possible values for the given result field. If one or more bitmap indexes are defined for the given result field, it is determined whether the one or more bitmap indexes are associated with all possible values.

If the possible values cannot be determined on the basis of the one or more retrieved indexes, processing proceeds with step 460. Otherwise, the possible values are identified at step 450 on the basis of the one or more retrieved indexes. After identification of the possible values at step 450, processing continues at step 340 of the method 300 of FIG. 3.

At step 460, it is determined whether an estimated duration for query execution runtime of the underlying query exceeds a predefined runtime threshold. In one embodiment, the predefined runtime threshold is a user-defined value representing an expected duration for execution of the underlying query against the partitioned database. However, it should be noted that any suitable requesting entity, including operating systems, applications and at the highest level users, can specify the expected duration. All such different implementations are broadly contemplated. More detailed explanations on how to determine the estimated duration are, however, omitted for brevity as this is well-known by the person skilled in the art.

In one embodiment, if the estimated duration does not exceed the predefined runtime threshold, query execution is likely to be completed faster by allowing the query to execute without implementing the query execution management techniques disclosed herein. Accordingly, querying the partitioned database to identify the possible values for the result field(s) is considered to be a waste of resources (e.g., processor cycles, memory, etc.) and time. Therefore, processing proceeds with step 480. If, however, the estimated duration exceeds the predefined runtime threshold, it is assumed that execution of the underlying query is expensive with respect to the required resources and time. Thus, querying the partitioned database to identify the possible values for the result field(s) to allow managing query execution according to embodiments of the invention is considered advantageous. Accordingly, the partitioned database is queried at step 470 to determine the possible values for the result field(s) from the database. Processing then continues at step 340 of the method 300 of FIG. 3.

At step 480, the possible values are set to "undefined" as a determination of these values was not successful. Processing then continues at step 340 of the method 300 of FIG. 3.

Verifying the Query Execution Status

Figure 5:
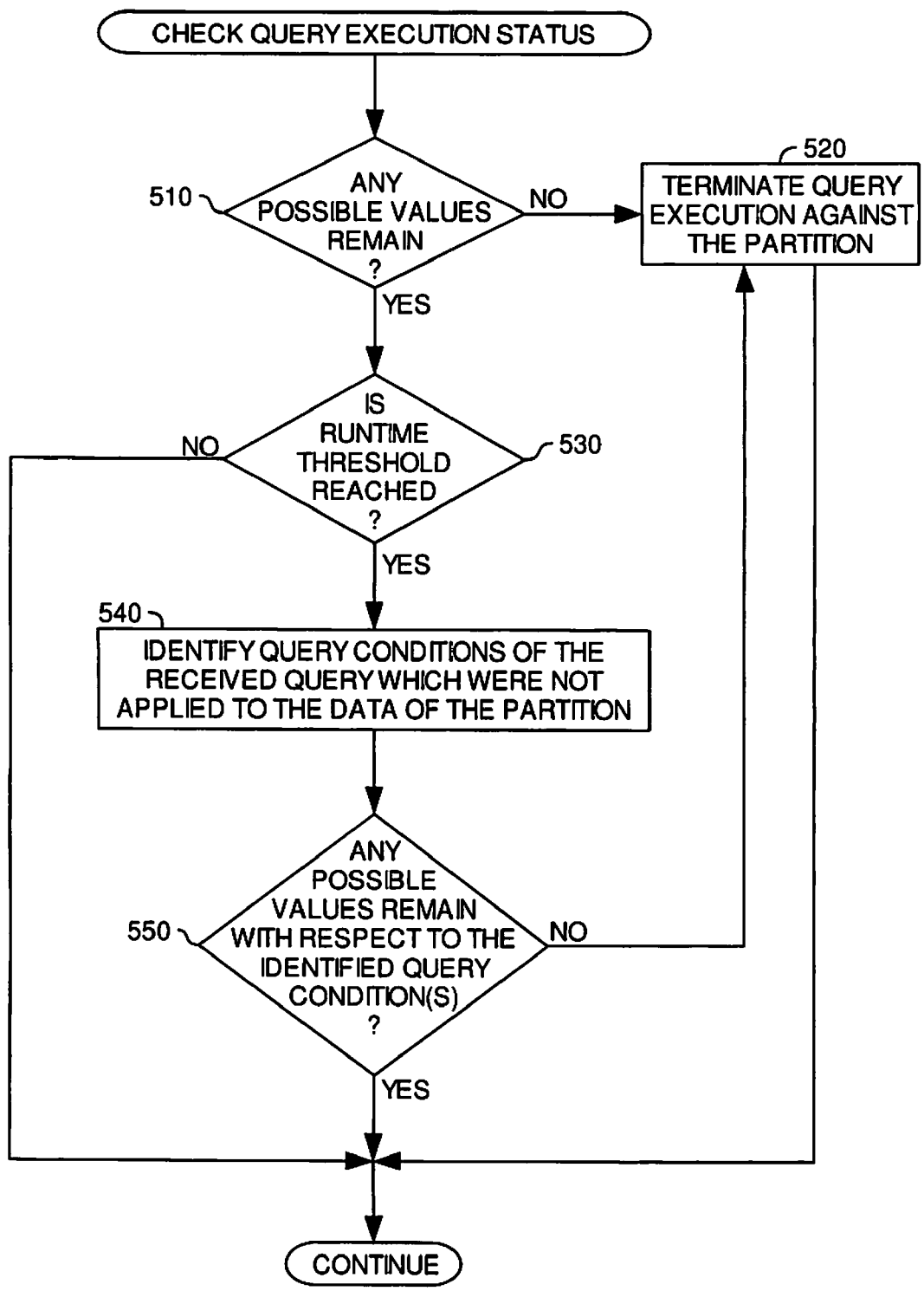
FIG. 5 is a flow chart illustrating a method for verification of a query execution status according to one embodiment of the invention.

Referring now to FIG. 5, one embodiment of a method 500 for verifying a query execution status according to step 370 of the method 300 of FIG. 3 is described. In one embodiment, the query execution status is verified with respect to a given data partition (e.g., partitions 220, 230, 240 of FIG. 2) of a partitioned database (e.g., partitioned database 127 of FIG. 2). At least a portion of the steps of method 500 can be performed using the query execution component 124 of FIG. 1.

Method 500 starts at step 510 for an active data partition having a multiplicity of data records. At least a portion of the multiplicity of data records is returned in response to execution of an underlying query (e.g., query 210 of FIG. 2) against the active partition.

At step 510, it is determined whether all possible values for one or more result fields of the underlying query were retrieved from the active partition. If so, processing proceeds with step 520. Otherwise, processing proceeds with step 530.

In one embodiment, determining whether all possible values for the result field(s) were retrieved from the active partition includes determining whether data records returned from the active partition include one or more of the possible values. If the data records and/or previously returned data records from other data partitions for the underlying query contain all possible values (i.e., the possible values that were identified in step 330 of FIG. 3), it is assumed that a complete query result for the underlying query was determined. Accordingly, a continued execution of the underlying query against the active data partition would subsequently only provide redundant results. Accordingly, execution of the underlying query against the active partition is terminated at step 520. In one embodiment, terminating query execution against the active data partition includes setting the status flag of the partition with respect to the underlying query to "inactive". Processing then continues at step 360 of the method 300 of FIG. 3.

As was noted above with respect to steps 410 to 420 of the method 400 of FIG. 4, the possible values 5 to 12 were determined in the given example for the "grade" result field (line 002 of Table I) of the exemplary SQL query of Table I above. Assume now that the exemplary SQL query of Table I is executed against the exemplary "student_grades" tables of Tables II to V representing four different data partitions of an underlying partitioned database. Assume further that the exemplary SQL query of Table I is still running on all partitions and that the method 500 is performed initially with respect to the eastern partition having the "student_grades" table of Table II above, from which only the data records according to lines 002, 004-006 and 008-010 were returned. Accordingly, it is determined at step 510 that the returned data records do not include all possible values, i.e., 5 to 12 in the "grade" column of Table II, as the possible value "11" in the "grade" column of line 011 of Table II is missing. Accordingly, Processing proceeds with step 530.

At step 530, it is determined whether an accumulated duration of query execution runtime for the underlying query against the active partition exceeds a predefined runtime threshold (i.e., the predefined runtime threshold defined according to step 460 of FIG. 4). If so, processing proceeds with step 540. Otherwise, processing continues at step 360 of the method 300 of FIG. 3.

At step 540, corresponding selection criteria having one or more query conditions are retrieved from the underlying query. The retrieved selection criteria are analyzed to determine the individual query condition(s) therefrom. Furthermore, from the identified query conditions all conditions which were not yet applied to the multiplicity of data records of the active data partition are identified.

At step 550, it is determined whether application of the identified query conditions to the multiplicity of data records of the active partition allows retrieving one or more data records having possible values that were not yet returned from the active partition. If so, processing continues at step 360 of the method 300 of FIG. 3. Otherwise, processing proceeds with step 520 as described above.

For instance, in the given example the exemplary SQL query of Table I may request data with respect to students that are older than 25 years or married. Assume now that in the given example the predefined runtime threshold is exceeded and that the returned data records described above with reference to steps 510-520 (i.e., the data records according to lines 002, 004-006 and 008-010 of Table II) are related to students that are older than 25. Assume further that the data record included with line 011 of Table II relates to a married student who is 24 years old. In other words, application of the query condition related to married students allows retrieving the missing possible value "11" from the "student_grades" table of Table II. Accordingly, processing continues at step 360 of the method 300 of FIG. 3.

Assume now that in the given example the missing possible value "11" is not included with data records returned from the other data partitions, i.e., the northern, southern and western partitions. Accordingly, the method 500 is subsequently re-entered for the eastern partition according to Table II, which is still active, as described above with reference to steps 350-380 of FIG. 3. Assume further that prior to reentering the method 500 the data record defined by line 011 of Table II was returned from the exemplary "student_grades" table of Table II that represents the eastern partition. Accordingly, it is determined that all possible values were returned with data records from the active eastern partition. Thus, the status flag of the eastern partition is set to "inactive". Furthermore, when the method 500 is subsequently performed on all other data partitions, their respective status flags are also set to "inactive", as the data records returned from the eastern data partition already include all possible values for the "grade" result field. Accordingly, the execution status of all data partitions is set to "inactive" so that query execution is terminated as described by way of example with respect to step 380 of the method 300 of FIG. 3 above.

While the foregoing is directed to embodiments of the present invention, other and further embodiments of the invention may be devised without departing from the basic scope thereof, and the scope thereof is determined by the claims that follow.

What is claimed is:

1. A computer-implemented method of managing execution of a query against a partitioned database having a plurality of data partitions, each data partition containing different data relative to the other data partitions, comprising:
   in response to a request from a requester, issuing a query for execution against each of the plurality of data partitions, resulting in separate, parallel instances of the query being executed against each respective data partition;
   receiving a query result from at least some of the plurality of data partitions;
   determining whether a complete query result is returned for the query, based on query results already returned by the executions of the respective query against the at least some of the data partitions, before execution of the query has completed against each of the plurality of data partitions;
   upon determining that the complete query result is returned for the query before execution of the query has completed against each of the plurality of data partitions, terminating execution of the query on at least one of the plurality of data partitions, wherein terminating execution of the query on at least one of the plurality of data partitions comprises terminating execution of the query on each data partition of the plurality of data partitions for which a result set has not yet been returned; and
   returning the complete query result to the requester.

2. The method of claim 1, wherein determining whether the complete query result is returned comprises:
   determining whether data records returned from one or more of the plurality of data partitions define the complete query result.

3. The method of claim 1, further comprising:
   determining values for a particular result field of the complete query result, wherein the complete query result is returned for the query before execution of the query has completed if data records returned for the query from each of the plurality of data partitions include the determined values.

4. The method of claim 3, wherein determining the values comprises:
   retrieving one or more check constraints associated with the particular result field; and
   identifying the values for the particular result field on the basis of the retrieved one or more check constraints.

5. The method of claim 4, wherein a given check constraint defines a range of values for the particular result field.

6. The method of claim 3, wherein determining the values comprises:
   retrieving an encoded vector index and a corresponding lookup table associated with the particular result field; and
   identifying the values from the lookup table.

7. The method of claim 3, wherein determining the values comprises:
   retrieving one or more indexes associated with the values of the particular result field; and
   identifying the values on the basis of the retrieved indexes.

8. The method of claim 3, wherein determining the values comprises:
   querying the partitioned database to determine the values for the particular result field.

9. The method of claim 8, further comprising:
   estimating a required query execution time for execution of the received query on the plurality of data partitions, and
   determining whether the estimated query execution time exceeds a predetermined runtime threshold, wherein the partitioned database is only queried to determine the values if the estimated query execution time exceeds the predetermined runtime threshold.

10. A computer-readable storage medium containing a program which, when executed by a processor, performs a process for managing execution of a query against a partitioned database having a plurality of data partitions, each data partition containing different data relative to the other data partitions, the process comprising:
    in response to a request from a requester, issuing a query for execution against each of the plurality of data partitions, resulting in separate, parallel instances of the query being executed against each respective data partition;
    determining whether a complete query result is returned for the query, based on results already returned by the executions of the respective query against at least some of the data partitions, before execution of the query has completed against each of the plurality of data partitions;
    upon determining that the complete query result is returned for the query before execution of the query has completed against each of the plurality of data partitions, terminating execution of the query on at least one of the plurality of data partitions, wherein terminating execution of the query on at least one of the plurality of data partitions comprises terminating execution of the query on each data partition of the plurality of data partitions for which a result set has not yet been returned; and
    returning the complete query result to the requester.

11. The computer-readable storage medium of claim 10, wherein determining whether the complete query result is returned comprises:

determining whether data records returned from one or more of the plurality of data partitions define the complete query result.

12. The computer-readable storage medium of claim 10, wherein the process further comprises:

determining values for a particular result field of the complete query result, wherein the complete query result is returned for the query before execution of the query has completed if data records returned for the query from each of the plurality of data partitions include the determined values.

13. The computer-readable storage medium of claim 12, wherein determining the values comprises:

retrieving one or more check constraints associated with the particular result field; and identifying the values for the particular result field on the basis of the retrieved one or more check constraints.

14. The computer-readable storage medium of claim 13, wherein a given check constraint defines a range of values for the particular result field.

15. The computer-readable storage medium of claim 12, wherein determining the values comprises:

retrieving an encoded vector index and a corresponding lookup table associated with the particular result field; and identifying the values from the lookup table.

16. The computer-readable storage medium of claim 12, wherein determining the values comprises:

retrieving one or more indexes associated with the values of the particular result field; and identifying the values on the basis of the retrieved indexes.

17. The computer-readable storage medium of claim 12, wherein determining the values comprises:

querying the partitioned database to determine the values for the particular result field.

18. The computer-readable storage medium of claim 17, wherein the process further comprises:

estimating a required query execution time for execution of the received query on the plurality of data partitions, and determining whether the estimated query execution time exceeds a predetermined runtime threshold, wherein the partitioned database is only queried to determine the values if the estimated query execution time exceeds the predetermined runtime threshold.

* * * * *